United States Patent
Inoue et al.

(10) Patent No.: US 11,372,584 B2
(45) Date of Patent: Jun. 28, 2022

(54) STORAGE SYSTEM, PATH MANAGEMENT METHOD, AND RECORDING MEDIUM

(71) Applicant: Hitachi, Ltd., Tokyo (JP)

(72) Inventors: Shinri Inoue, Tokyo (JP); Kouji Iwamitsu, Tokyo (JP); Takao Totsuka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 37 days.

(21) Appl. No.: 16/820,899

(22) Filed: Mar. 17, 2020

(65) Prior Publication Data

US 2021/0096771 A1 Apr. 1, 2021

(30) Foreign Application Priority Data

Sep. 27, 2019 (JP) .............................. JP2019-176446

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC .. G06F 11/202; G06F 11/008; G06F 11/2023; G06F 3/0613; G06F 3/0659; G06F 3/0611; G06F 3/0673; G06F 3/0653; G06F 3/0635; G06F 3/0617
See application file for complete search history.

(56) References Cited

U.S. PATENT DOCUMENTS

| | | | |
|---|---|---|---|
| 10,229,021 B1 | 3/2019 | Iwamitsu et al. | |
| 10,642,705 B2 | 5/2020 | Furuya | |
| 2011/0179188 A1* | 7/2011 | Nakagawa | G06F 3/067 709/240 |
| 2012/0254657 A1 | 10/2012 | Kodaira | |
| 2015/0205650 A1* | 7/2015 | Shimada | G06F 11/008 714/703 |
| 2019/0155532 A1* | 5/2019 | Takakura | G06F 3/061 |

FOREIGN PATENT DOCUMENTS

| | | |
|---|---|---|
| JP | 2007-34438 A | 2/2007 |
| JP | 2012-208896 A | 10/2012 |
| JP | 2012-531654 A | 12/2012 |
| JP | 2018156144 A | 10/2018 |
| JP | 2019-101700 A | 6/2019 |
| JP | 2019-125075 A | 7/2019 |

OTHER PUBLICATIONS

Japanese Office Action received in corresponding Japanese Application No. 2019-176446 dated Apr. 27, 2021.

* cited by examiner

*Primary Examiner* — Ernest Unelus
(74) *Attorney, Agent, or Firm* — Mattingly & Malur, PC

(57) ABSTRACT

A storage system includes a plurality of storage nodes 4 each having one or more storage devices. The storage node includes a CPU. The CPU is configured to select a priority path to be notified as a usable path to a higher-level apparatus among paths which allows access of a predetermined logical unit to which a storage area of the storage device is provided from the higher-level apparatus. The CPU is configured to send the priority path as a reply to an inquiry about a path to the predetermined logical unit from the higher-level apparatus.

7 Claims, 10 Drawing Sheets

FIG. 4

CTLM table 60

| Computenode# 61 | Target# 62 | LUN management table 64 | 63 65 |
|---|---|---|---|
| | | LUN | Volume# |
| 1 | 0 | 0 | 0 |
| | | 1 | 1 |
| | | 2 | 2 |
| | | 3 | 3 |
| | . . . | 4 | 4 |
| | | 5 | 5 |
| | | 6 | 6 |
| | | 7 | 7 |
| | 3 | 8 | 8 |
| | | . . . | . . . |
| | | N | N |
| 2 | 4 | 0 | 0 |
| | . . . | 1 | 1 |
| | 7 | 2 | 2 |

FIG. 5

Path priority management table 20

| Volume#0 21 | StorageNode# 22 | Priority target#0 23 | Second priority target#0 24 | Third priority target#0 25 | Fourth priority target#0 26 |
|---|---|---|---|---|---|
| : | : | : | : | : | : |
| Volume#M | StorageNode# | Priority target#M | Second priority target#M | Third priority target#M | Fourth priority target#M |

FIG. 6

CLM table 41     40     42

| Computenode# | LUN management table 43 | 44 |
| --- | --- | --- |
| | LUN | Volume# |
| 1 | 0 | 0 |
| | 1 | 1 |
| | 2 | 2 |
| | 3 | 3 |
| | 4 | 4 |
| | 5 | 5 |
| | 6 | 6 |
| | 7 | 7 |
| | 8 | 8 |
| | . . . | . . . |
| | N | N |
| 2 | 0 | 0 |
| | 1 | 1 |
| | 2 | 2 |

FIG. 7

Node pair management table

| | 31 | 32 | 33 | 30 |
|---|---|---|---|---|
| | StorageControlUnitPair#1 | ActiveStorageNode# | StandbyStorageNode# | |
| | ... | ... | ... | |
| | StorageControlUnitPair#M | ActiveStorageNode# | StandbyStorageNode# | |

FIG. 8

Storage control unit (SC) chain table

| 51 | 52 | 53 | 54 | 55 | 50 |
|---|---|---|---|---|---|
| StorageNode# | ActiveSC# | StandbySC# ※SecondActiveSC# | SecondStandbySC# ※ThirdActiveSC# | ThirdStandbySC# | |
| ... | ... | ... | ... | ... | |
| StorageNode# | ActiveSC# | StandbySC# ※SecondActiveSC# | SecondStandbySC# ※ThirdActiveSC# | ThirdStandbySC# | |

STORAGE SYSTEM, PATH MANAGEMENT METHOD, AND RECORDING MEDIUM

CROSS-REFERENCE TO PRIOR APPLICATION

This application relates to and claims the benefit of priority from Japanese Patent Application No. 2019-176446 filed on Sep. 27, 2019, the entire disclosure of which is incorporated herein by reference.

BACKGROUND

The present invention relates to a storage system or the like which includes a plurality of storage nodes each having one or more storage devices and relates to a technique for managing a path for accessing from a higher-level apparatus to a logical device.

In recent years, the amount of data stored in companies, government offices, and the like is steadily increasing, and it is desirable that a storage system that stores data is configured to be able to scale out storage apparatuses easily.

Data stored in a storage system is managed as a logical unit. A higher-level apparatus (a host apparatus) that uses the data stored in the storage system manages a connection path to a logical unit managed in the storage system. A host apparatus can grasp a connection path to a logical unit by inquiring the storage system.

In a host apparatus, the upper limit of the configurable connection paths is different depending on the type of an operating system (OS) executed. Therefore, when the number of storage apparatuses increases due to scale-out or the like, the number of connection paths obtained from the storage systems may exceed the upper limit of the connection paths configurable in the OS.

In the manner, when the number of connection paths exceeds an upper limit, it is necessary to manually perform reconfiguring or the like of an OS, which takes a considerable amount of time.

In contrast, Japanese Patent Application Publication No. 2018-156144 discloses a technique of automatically updating a logical path on an OS of a host apparatus by selecting a logical path to be deleted and notifying a host apparatus of the selected logical path.

SUMMARY

However, in the technique disclosed in Japanese Patent Application Publication No. 2018-156144, the host apparatus needs to have a function of deleting a path in response to a path deletion notification from a storage apparatus. That is, it is necessary to add functions to the host apparatus so as to correspond to the storage apparatus.

It may be requested to select a path to be used by a host apparatus due to other configuration or limitations of the host apparatus or user's policy of the host apparatus.

The present invention has been made in view of the problems, and an object thereof is to provide a technique capable of allowing a higher-level apparatus to easily recognize an appropriate path.

In order to attain the object, a storage system according to an aspect is a storage system including a plurality of storage nodes each having one or more storage devices, wherein the storage node includes a processor unit, the processor unit is configured to select a priority path to be notified as a usable path to a higher-level apparatus among paths along which the higher-level apparatus can access a predetermined logical unit to which a storage area of the storage device is provided, and to send the priority path as a reply to an inquiry about a path to the predetermined logical unit from the higher-level apparatus.

According to the present invention, it is possible to allow a higher-level apparatus to easily recognize an appropriate path.

BRIEF DESCRIPTION OF THE DRAWINGS

FIG. 4 is a configuration diagram of a CTLM table according to an embodiment.

FIG. 5 is a configuration diagram of a path priority management table according to an embodiment.

FIG. 6 is a configuration diagram of a CLM table according to an embodiment.

FIG. 7 is a configuration diagram of a node pair management table according to an embodiment.

FIG. 8 is a configuration diagram of a SC chain table according to an embodiment.

DETAILED DESCRIPTION OF THE EMBODIMENT

An embodiment will be described with reference to the drawings. The embodiments described below are not intended to limit the inventions according to the claims, and all elements and combinations thereof described in the embodiments are not necessarily essential to the solving means for the invention.

In the following description, although information is sometimes described using an expression of an "AAA table," the information may be expressed by an arbitrary data structure. That is, the "AAA table" may be referred to as "AAA information" in order to show that information does not depend on a data structure.

In the following description, a "processor unit" includes one or more processors. At least one processor is typically a microprocessor such as a CPU (Central Processing Unit). One or more processors may be single cores and may be multi-cores. The processor may include a hardware circuit that performs a part or all of the processes.

Figure 1:
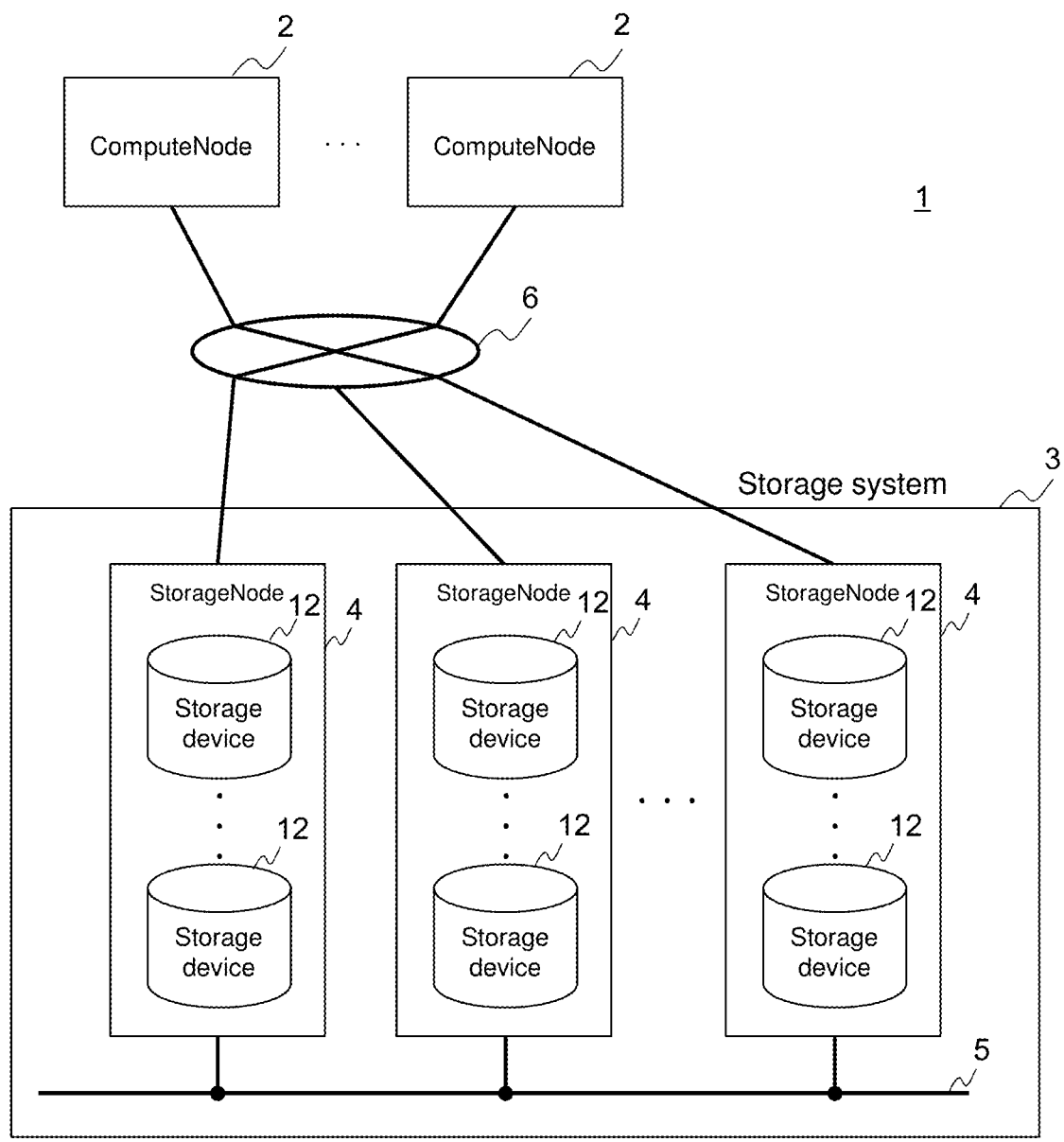
FIG. 1 is an overall configuration diagram of a computer system according to an embodiment.

FIG. 1 is an overall configuration diagram of a computer system according to an embodiment.

A computer system 1 includes one or more compute nodes 2 and a storage system 3. The storage system 3 includes a plurality of storage nodes 4. The compute node 2 and each of the storage nodes 4 of the storage system 3 are coupled via a network 6.

The network 6 is formed of a FC (Fibre Channel), the Ethernet (registered trademark), InfiniBand, or a wireless LAN (Local Area Network), for example.

The storage nodes 4 are coupled via a back-end network 5. The back-end network 5 is formed of the Ethernet (registered trademark), InfiniBand, or a wireless LAN, for example.

The network 6 and the back-end network 5 may be formed by the same network. Moreover, each of the compute nodes 2 and each of the storage nodes 4 may be coupled to a management network other than the network 6 or the back-end network 5.

The compute node 2 is formed of a general-purpose computer, for example, and functions as a host (a higher-level apparatus) of the storage system 3. The compute node 2 may be a virtual computer apparatus such as a virtual machine.

When logging into the storage system 3, for example, the compute node 2 inquires whether a path is a path accessible to a predetermined logical unit (LU) via each path of the storage system 3 and configures the path as a path accessible to the logical unit when a response that the path is a path accessible from the storage system 3 is received. The number of paths configurable in the compute node 2 may be limited to a predetermined number by an OS (Operating System) of the compute node 2.

The compute node 2 transmits a read request or a write request (also referred to as an access request or an I/O (Input/Output) request) to the storage system 3 via the network 6 in response to a user's operation or a request from an application program implemented therein.

The storage node 4 is formed of a general-purpose physical server and has a storage device 12 that provides a storage area for reading data from or writing data to the compute node 2.

Figure 2:
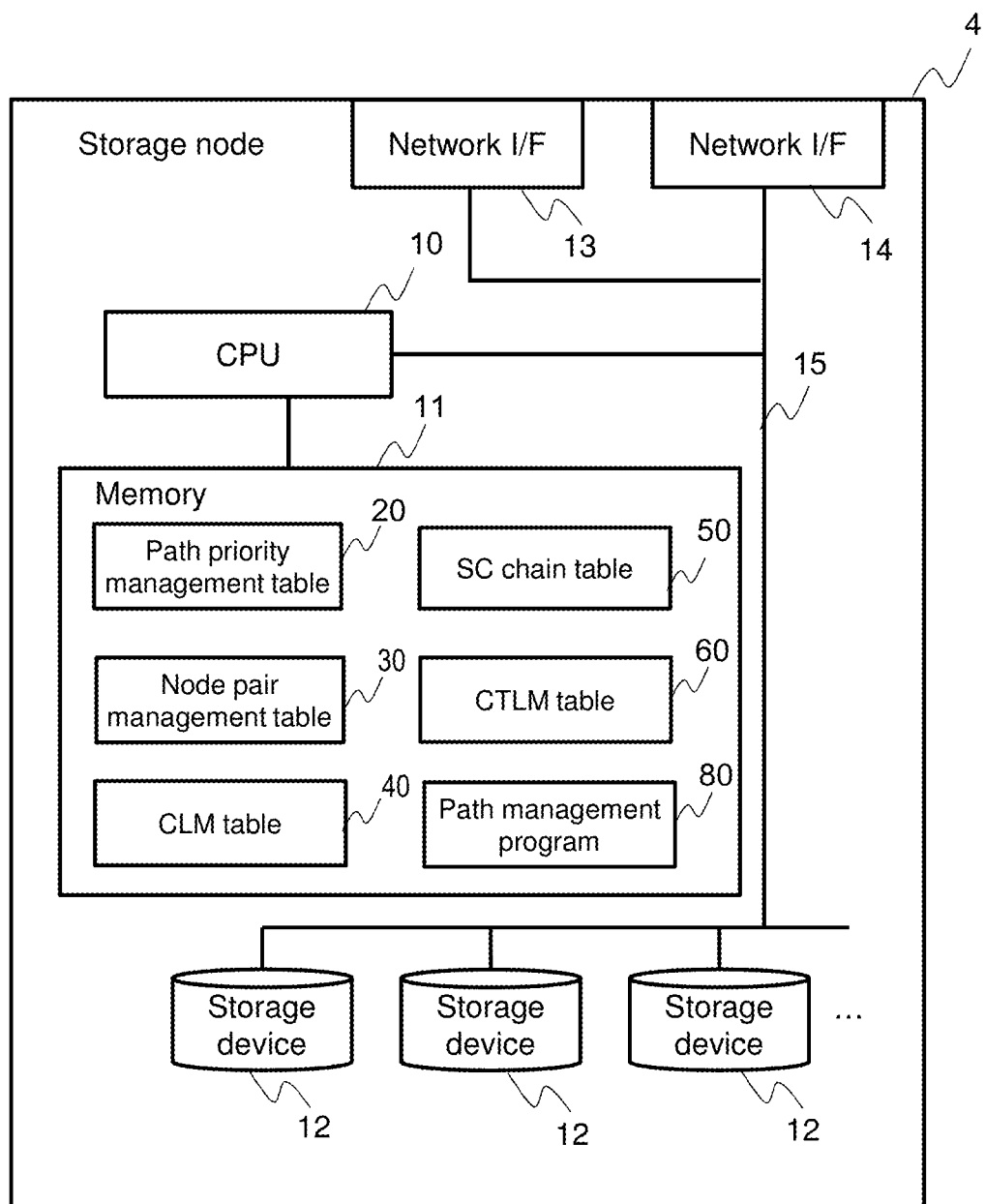
FIG. 2 is a configuration diagram of a storage node according to an embodiment.

FIG. 2 is a configuration diagram of a storage node according to an embodiment.

The storage node 4 is formed of a PC (Personal Computer), for example. The storage node 4 includes one or more CPUs (Central Processing Units) 10, one or more memories 11, a plurality of storage devices 12, one or more network interfaces (I/Fs) 13, and one or more network I/Fs 14. The CPU 10, the memory 11, the storage device 12, the network I/F 13, and the network I/F 14 are connected via an internal bus 15.

The network I/F 13 is an interface such as, for example, an FC card, a cable LAN card, or a wireless LAN card and performs protocol control during communication with other apparatus (for example, the compute node 2) via the network 6.

The network I/F 14 is an interface such as, for example, an NIC (Network Interface Card) card, a cable LAN card, or a wireless LAN card and performs protocol control during communication with other apparatus (the storage node 4) via the back-end network 5.

The CPU 10 executes various processes according to a program stored in the memory 11.

The memory 11 is a volatile semiconductor memory such as, for example, an SRAM (Static RAM (Random Access Memory)) or a DRAM (Dynamic RAM) and stores a program executed by the CPU 10 and necessary information.

The memory 11 stores a path priority management table 20, a node pair management table 30, a CLM (Compute Target Mapping) table 40, an SC (Storage Controller) chain table 50, a CTLM (Compute Target Lu Mapping) table 60, and a path management program 80. The path management program 80 being executed by the CPU 10 executes a process of managing paths, for example, including a path priority selection process, a volume path creation process, a volume path adding process, and a CTLM table generation process. The details of the tables of the memory 11 will be described later.

The storage device 12 is a nonvolatile storage device such as, for example, a NVMe (Non-Volatile Memory) drive, a SAS (Serial Attached SCSI (Small Computer System Interface) drive, a SATA (Serial ATA (Advanced Technology Attachment)), SSD (Solid State Drive), or SCM (Storage Class Memory) and provides a logical unit (a volume) having a storage area for reading data from or writing data to the compute node 2.

Figure 3:
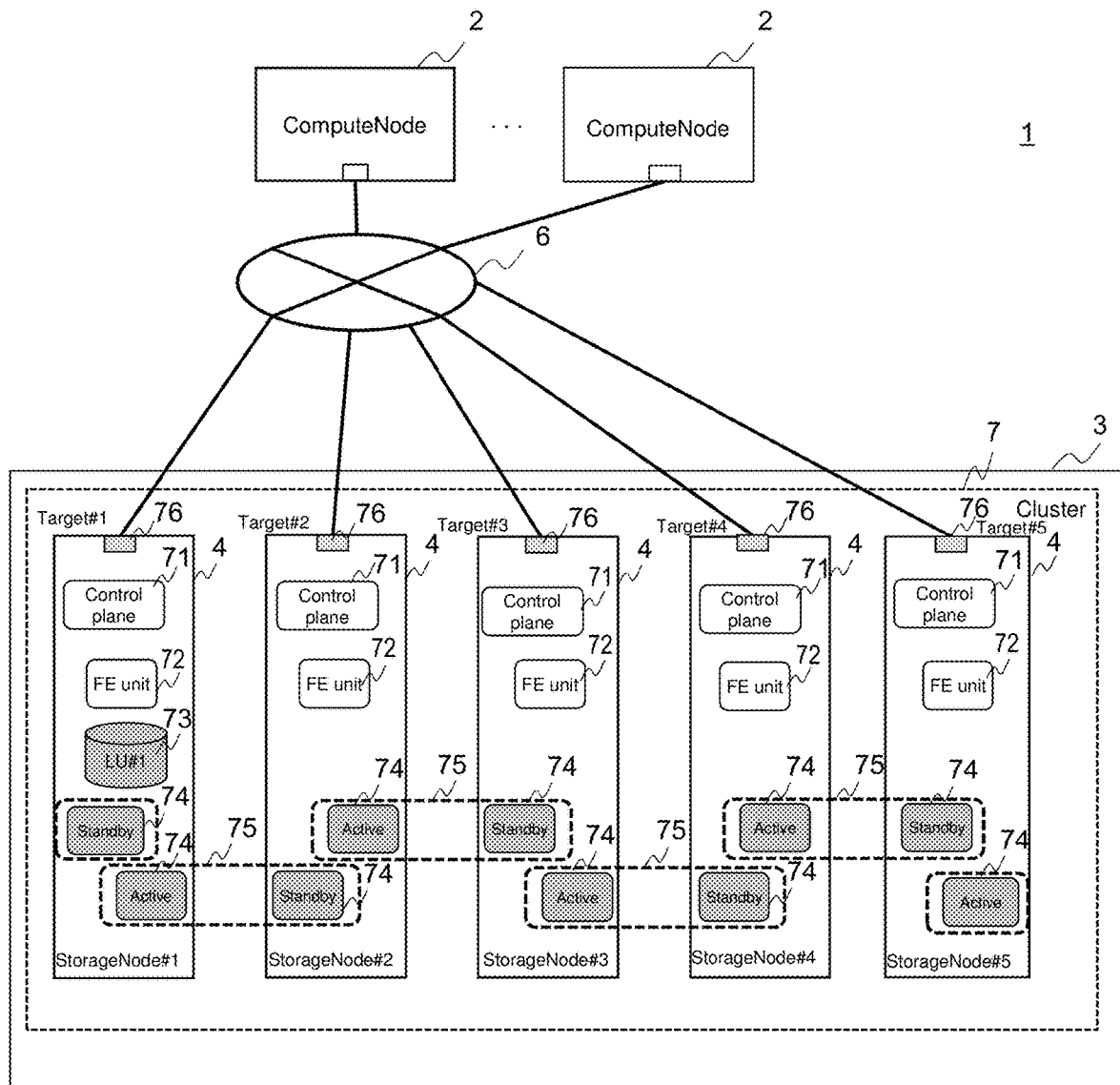
FIG. 3 is a diagram of a functional configuration of a computer system according to an embodiment.

FIG. 3 is a diagram of a functional configuration of a computer system according to an embodiment.

In the present embodiment, the storage system 3 manages a cluster 7 which is a group of a plurality of storage nodes 4 as a unit. Although one cluster 7 is illustrated in FIG. 3, a plurality of clusters may be provided.

The storage node 4 includes a control plane 71, a front-end unit (FE unit) 72, and one or more storage control units (SC units) 74.

The control plane 71 controls the entire cluster 7 and a subject node. When there is an inquiry about a path of an LU from the compute node 2 and the CTLM table 60 is present, the control plane 71 determines whether a compute node number of the inquiry source compute node 2 and a LUN of an inquiry target LU are registered by referring to the CTLM table 60 and sends that the path is accessible to the compute node 2 as a reply when the compute node number and the LUN are registered. In contrast, when the CTLM table 60 is not present, the control plane 71 determines whether a compute node number of the inquiry source compute node 2 and the LUN of the inquiry target LU are registered by referring to the CLM table 40 and sends that the path is accessible to the compute node 2 as a reply when the compute node number and the LUN are registered.

The FE unit 72 functions as a front-end of an I/O process of the storage node 4. For example, when an I/O request is received from the compute node 2, the FE unit 72 distributes the I/O request to the storage control unit 74 in the subject node and the storage control unit 74 of the other node.

The storage control unit 74 functions as a controller of a SDS (Software Defined Storage). In the present embodiment, the storage control unit 74 is realized when the CPU 10 executes storage control software (not illustrated). The storage control unit 74 receives an I/O request from the compute node 2, received from the FE unit 72 and executes an I/O process with respect to the LU 73 according to the received I/O request.

In the present embodiment, the storage control units 74 of the storage node 4 are configured as a pair (a storage control unit pair) 75 that forms a redundant configuration together with the storage control units 74 of another storage node 4. A redundant configuration may be formed of three or more storage control units 74.

In the storage control unit pair 75, one storage control unit 74 is configured to a state (referred to as the state of an active system or an active mode) of being able to accept an I/O request from the compute node 2, and the other storage control unit 74 is configured to a state (referred to as the state of a standby system or a standby mode) of not accepting an I/O request from the compute node 2.

In the storage control unit pair 75, when a failure occurs in the storage control unit 74 (referred to as an active storage control unit) configured to the active mode or the storage node 4 where the storage control unit 74 is disposed, the storage control unit 74 (referred to as a standby storage control unit) configured to the standby mode is switched to an active mode. In the way, when the active storage control unit 74 is unable to operate, the I/O process being executed by the storage control unit 74 is inherited to the standby storage control unit 74 that forms the storage control unit pair 75.

In the storage node 4, the LU 73 is provided to the compute node 2 as a storage area that stores data. The LU 73 is managed in correlation with a volume in the storage node 4. When accessing the LU 73, the compute node 2 transmits an I/O request to a target 76 defined in the storage node 4. In order to realize this, the compute node 2 manages paths for accessing the LU 73 from a physical port (not illustrated) of the subject node to the target 76 of the storage node 4. The target 76 is correlated with the physical port of the network I/F 13 of the storage node 4 in one-to-one correspondence.

FIG. 4 is a configuration diagram of a CTLM table according to an embodiment.

The CTLM table 60 stores a correspondence between a logical unit provided to the compute node 2 and the volume of the storage system 3. The entry of the CTLM table 60 includes the fields of compute node #(number) 61, target #(number) 62, LUN 64, and Volume #(number) 65. The fields of LUN 64 and Volume #(number) 65 form a LUN management table 63. In the present embodiment, each storage node 4 is configured to store only entries corresponding to a target number present in the subject node in the CTLM table 60 illustrated in FIG. 4.

An identification number (a compute node number) of the compute node 2 corresponding to the entry is stored in the compute node #61. An identification number (a target number) of the target 76 of the storage node 4 when accessing a volume corresponding to the entry is stored in the target #62. An identification number (LUN) of a logical unit corresponding to the entry is stored in the LUN 64. The LUN is a unique number of a logical unit in the compute node 2. The number of a volume corresponding to the entry is stored in the Volume #(number) 65. A volume number is a unique number in the storage system 3.

FIG. 5 is a configuration diagram of a path priority management table according to an embodiment.

The path priority management table 20 is provided in respective compute nodes 2. The path priority management table 20 is a table for managing a prioritizing ticket (corresponding to a priority path) of each volume and has entries for each volume. The entry of the path priority management table 20 includes the fields of volume number 21, storage node number 22, priority target number 23, second priority target number 24, a third priority target number 25, and fourth priority target number 26.

An identification number of a volume corresponding to the entry is stored in the volume number 21. An identification number of the storage node 4 that stores a volume corresponding to the entry is stored in the storage node number 22. The number of a first target which is preferably used preferentially when accessing a volume corresponding to the entry is stored in the priority target number 23. The number of a second target which is preferably used preferentially when accessing a volume corresponding to the entry is stored in the second priority target number 24. The number of a third target which is preferably used preferentially when accessing a volume corresponding to the entry is stored in the third priority target number 25. The number of a fourth target which is preferably used preferentially when accessing a volume corresponding to the entry is stored in the fourth priority target number 26.

FIG. 6 is a configuration diagram of a CLM table according to an embodiment.

The CLM table 40 stores a correspondence between a logical unit in the compute node 2 and a volume in the storage system 3 with respect to each volume accessible by the storage node 4. The entry of the CLM table 40 includes the fields of compute node #(number) 41, LUN 43, and Volume #(number) 44. The fields of LUN 43 and Volume #(number) 44 form a LUN management table 42.

An identification number (compute node number) of the compute node 2 corresponding to the entry is stored in the compute node #41. An identification number (LUN) of the logical unit corresponding to the entry is stored in the LUN 43. The number of a volume corresponding to the entry is stored in the Volume #(number) 44.

FIG. 7 is a configuration diagram of a node pair management table according to an embodiment.

The node pair management table 30 is a table for managing the storage control unit pair 75 and stores entries for each storage control unit pair 75. The entry of the node pair management table 30 includes the fields of storage control unit pair #(number) 31, active storage node #(number) 32, and standby storage node #(number) 33.

An identification number of the storage control unit pair 75 (storage control unit pair number) is stored in the storage control unit pair number 31. An identification number of a storage node 4 (an active storage node) that stores a storage control unit 74 in an active state within the storage control unit pair 75 corresponding to the entry is stored in the active storage node number 32. An identification number of a storage node 4 (a standby storage node) that stores a storage control unit 74 in a standby state within the storage control unit pair 75 corresponding to the entry is stored in the standby storage node number 33.

FIG. 8 is a configuration diagram of a SC chain table according to an embodiment.

The SC (storage control unit) chain table 50 is a table for managing the storage control units 74 which can be traced on the basis of the relationship of the storage control unit pair 75 from the active storage control unit and has entries for each storage node 4. The entry of the SC chain table 50 includes the fields of storage node #51, active storage control unit #52, standby storage control unit #53, second standby storage control unit #54, and third standby storage control unit #55.

The number of the storage node 4 corresponding to the entry is stored in the storage node #51. The number of the active storage control unit 74 executing an I/O process of a volume of the storage node 4 corresponding to the entry is stored in the active storage control unit #52. The number of the standby storage control unit 74 that forms the storage control unit pair 75 with the active storage control unit 74 corresponding to the entry is stored in the standby storage control unit #53. The number of the standby storage control unit 74 that forms the storage control unit pair 75 with the active storage control unit 74 in the storage node 4 in which the standby storage control unit 74 corresponding to the number of the standby storage control unit #53 is present is stored in the second standby storage control unit #54. The number of the standby storage control unit 74 that forms the storage control unit pair 75 with the active storage control unit 74 in the storage node 4 in which the standby storage control unit 74 corresponding to the number of the second standby storage control unit #54 is present is stored in the third standby storage control unit #55.

Next, a processing operation of the computer system 1 will be described. First, a path priority selection process will be described.

Figure 9:
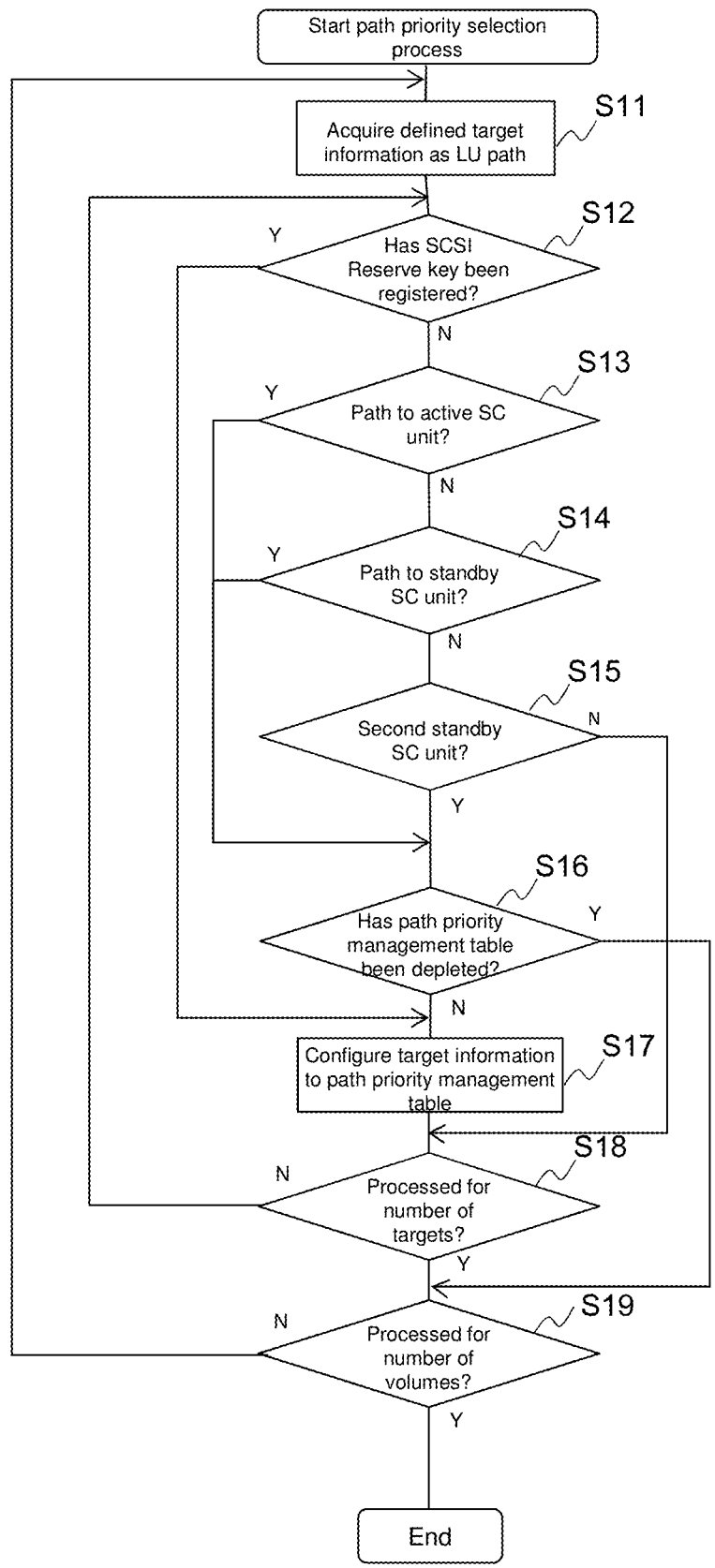
FIG. 9 is a flowchart of a path priority selection process according to an embodiment.

FIG. 9 is a flowchart of a path priority selection process according to an embodiment.

The path priority selection process is a process executed by the control plane 71 of the storage node 4 when the storage system 3 is activated, for example. This process of the control plane 71 is realized by the CPU 10 executing the path management program 80.

First, the CPU 10 sets one non-processed LU among the LUs (corresponding to volumes) managed by the storage nodes 4 as a processing target, and acquires defined target information from the storage nodes 4 as a path of the processing target LU (target LU) (step S11). Here, the target information may include a target number, an LU number, and an exclusive management key (for example, SCSI Reserve key) when a corresponding path is exclusively managed.

Subsequently, the CPU 10 performs the following processes (S12 to S17) with respect to the path (a target path) of a non-processed target among the targets of the path of the target LU. First, the CPU 10 determines whether an exclusive management key is registered as the target information of the target of the processing target (a target) (step S12). When the exclusive management key is registered (step S12: Y), since it indicates that the path is necessary for exclusive management, the processing is proceeded to step S17 in order to register the path in the path priority management table 20.

In contrast, when the exclusive management key is not registered (step S12: N), the CPU 10 determines whether the path is a path to the active storage control unit 74 (step S13).

When the path is a path to the active storage control unit 74 (step S13: Y), since it indicates that the path enables high-speed access to the target LU, the processing is proceeded to step S16.

In contrast, when the target path is not a path to the active storage control unit 74 (step S13: N), the CPU 10 determines whether the target path is a path to the standby storage control unit 74 (step S14).

When the target path is a path to the standby storage control unit 74 (step S14: Y), since it indicates that the path is a path accessible quickly to the active storage control unit 74 in the event of failure, the processing is proceeded to step S16.

In contrast, when the target path is not a path to the standby storage control unit 74 (step S14: N), the CPU 10 determines whether the target path is a path to the second standby storage control unit 74 (step S15). Here, the second standby storage control unit 74 is a standby storage control unit 74 of another storage node 4 that forms the storage control unit pair 75 with an active storage control unit 74 present in the same storage node 4 as the standby storage control unit 74.

When the target path is a path to the second standby storage control unit 74 (step S15: Y), since it indicates that the path is a path which is subsequently accessible quickly to the active storage control unit 74 and the standby storage control unit 74 in the event of failure, the processing is proceeded to step S16.

In contrast, when the target path is not a path to the second standby storage control unit 74 (step S15: N), the CPU 10 proceeds the process to step S18.

In step S16, the CPU 10 determines whether the path priority management table 20 is depleted, that is, whether target numbers are stored in the fields 23 to 26 of all priority targets of the corresponding entry.

When the path priority management table 20 is depleted (step S16: Y), since it means that a predetermined number of candidate paths for the target LU are prepared, the CPU proceeds the process to step S19.

In contrast, when the path priority management table 20 is not depleted (step S16: N), or when the exclusive management key is registered (step S12: Y), the CPU 10 configures the number of the target for which a determination result of Y is obtained in steps S12 to S15 to the vacant field of the fields (fields 23 to 26) of the priority target of the corresponding entry of the path priority management table 20 (step S17) and proceeds the process to step S18.

In step S18, the CPU 10 determines whether the process has been performed for a number of targets corresponding to the number of targets acquired in step S11. When the process has not been performed for the corresponding number of targets (step S18: N), the CPU proceeds the process to step S12 and executes the processes subsequent to step S12 with respect to the other targets. In contrast, when the process has been performed for the corresponding number of targets (step S18: Y), the CPU proceeds the process to step S19.

In step S19, the CPU 10 determines whether the process has been performed for all LUs managed by the storage node 4. When the process has not been performed for all LUs (step S19: N), the CPU 10 proceeds the process to step S11 and performs the process for the other LUs. In contrast, when the process has been performed for all LUs (step S19: Y), the CPU 10 ends the process.

According to the above-described path priority selection process, it is possible to select a path to a predetermined number of targets or smaller matching a predetermined condition appropriately as a path for accessing an LU (volume) and configure the path to the path priority management table 20.

Next, a volume path creation process will be described.

Figure 10:
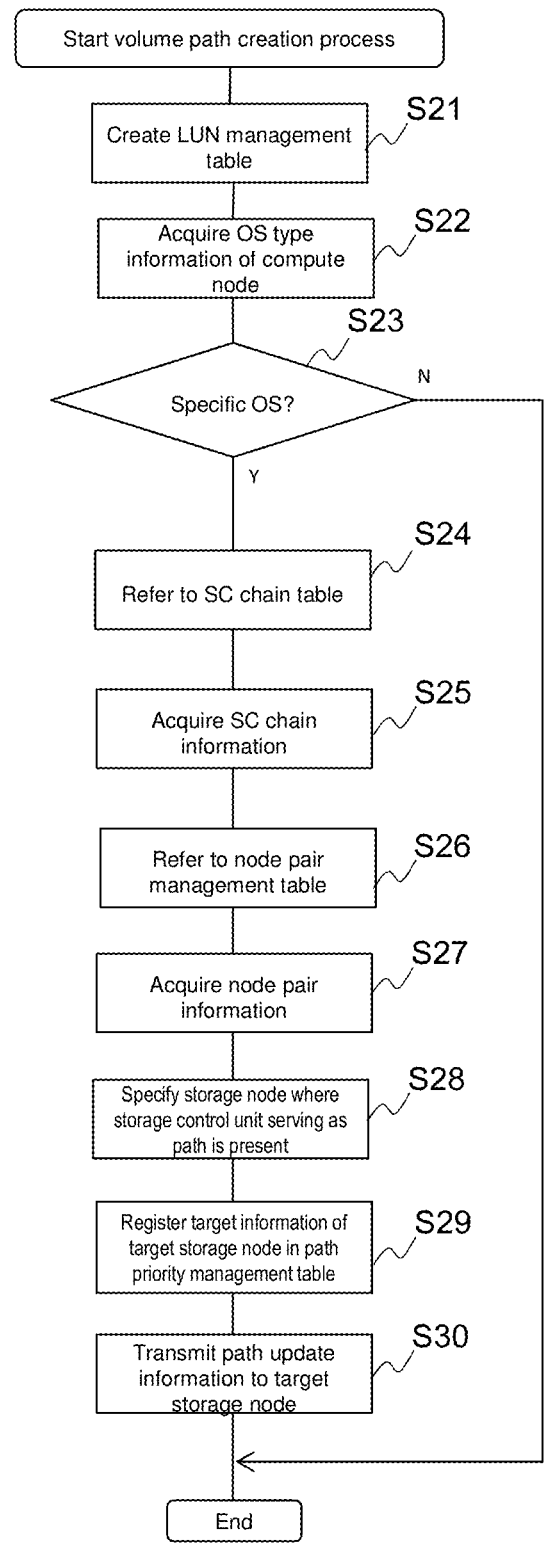
FIG. 10 is a flowchart of a volume path creation process according to an embodiment.

FIG. 10 is a flowchart of a volume path creation process according to an embodiment.

A volume path creation process is executed in the storage node 4 in which a new LU is created when the new LU is created.

The CPU 10 of the storage node 4 adds a correspondence between a new LU and a volume allocated to the LU to the LUN management table 42 of the CLM table 40 (step S21). Subsequently, the CPU 10 acquires OS type information (an example of number-of-paths specifying information) of the compute node 2 which uses the LU (step S22).

Subsequently, the CPU 10 determines whether the OS of the compute node 2 is a specific OS (in the example, an OS in which the number of configurable paths of the LU is equal to or smaller than a predetermined number (for example, four)) on the basis of the OS type information (step S23). When the OS is not a specific OS (step S23: N), the volume path creation process ends since it is not necessary to limit the number of paths of the LU.

In contrast, when the OS is a specific OS (step S23: Y), the CPU 10 refers to the SC chain table 50 (step S24) to acquire chain information indicating a connection of the storage nodes 4 from the SC chain table 50 (step S25).

Subsequently, the CPU 10 refers to the node pair management table 30 (step S26) to acquire node pair information, that is, information of n the storage node 4 that stores another storage control unit 74 that forms the storage control unit pair 75) from the node pair management table 30 (step S27).

Subsequently, the CPU 10 specifies the storage node 4 (target storage node) in which a predetermined number of storage control units 74 serving as the path of the LU are present (step S28). The predetermined number of storage control units 74 serving as the path of the LU may be the storage control unit 74 corresponding to the determination target of steps S13, S14, and S15.

Subsequently, the CPU 10 registers the target information of the target storage node in the path priority management table 20 (step S29). That is, the CPU 10 creates the entry of a volume corresponding to the created LU in the path priority management table 20 and stores the target information (target number) of the target storage node 4 in the entry.

Subsequently, the CPU 10 transmits path update information to the target storage node (step S30). Here, the path update information includes the LUN of the created LU, the volume number of the corresponding volume, and the target information registered in step S29.

According to the volume path creation process, it is possible to notify the storage node 4 having a target serving as a path of the information on the path of an LU created newly and send the path registered in the path priority management table 20 to the compute node 2 appropriately as a reply when the storage node 4 receive an inquiry from the compute node 2 through a volume path adding process and a CTLM table generation process to be described later.

Next, a volume path adding process will be described.

Figure 11:
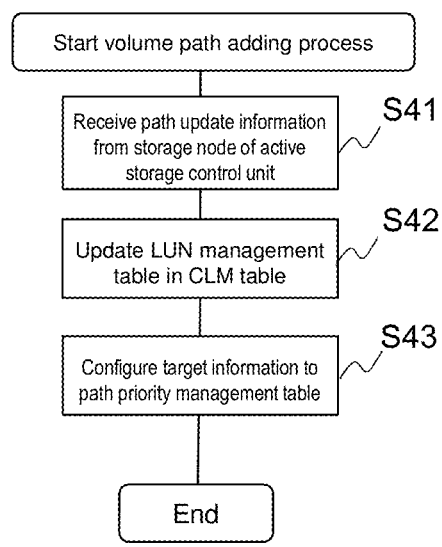
FIG. 11 is a flowchart of a volume path adding process according to an embodiment.

FIG. 11 is a flowchart of a volume path adding process according to an embodiment.

The volume path adding process is a process executed by a target storage node to which the path update information is transmitted in the volume path creation process.

First, the CPU 10 of the target storage node 4 receives path update information from the storage control unit 74 having executed the volume path creation process, that is, the storage node 4 having the active storage control unit 74 with respect to the LU (step S41).

Subsequently, the CPU 10 of the storage node 4 adds the LUN and the volume number included in the path update information to the LUN management table 42 of the CLM table 40 (step S42).

Subsequently, the CPU 10 of the storage node 4 configures target information based on the path update information to the path priority management table 20 (step S43).

According to the volume path adding process, it is possible to set information on a target serving as a path to an LU (volume) created newly to the path priority management table 20 appropriately.

Figure 12:
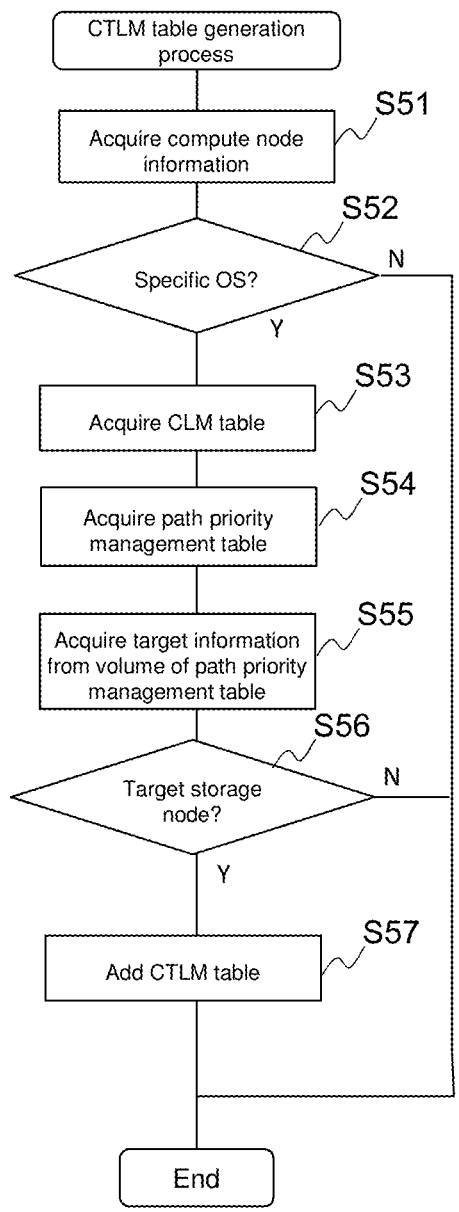
FIG. 12 is a flowchart of a CTLM table generation process according to an embodiment.

FIG. 12 is a flowchart of a CTLM table generation process according to an embodiment.

A CTLM table generation process is a process executed in the storage node 4 after the path priority management table 20 is created or updated by the path priority selection process, the volume path creation process, or the volume path adding process, for example.

The CPU 10 of the storage node 4 acquires information of the compute node 2, for example, OS type information (step S51). The acquisition source of the information of the compute node 2 may be the compute node 2 itself or may be another apparatus that collects the information of the compute node 2.

Subsequently, the CPU 10 of the storage node 4 determines whether the OS of the compute node 2 is a specific OS (an OS in which the number of configurable paths of the LU is equal to or smaller than a predetermined number (for example, four)) on the basis of the OS type information (step S52). When the OS of the compute node 2 is not a specific OS (step S52: N), the CPU 10 ends the process.

In contrast, when the OS of the compute node 2 is a specific OS (step S52: Y), the CPU 10 acquires the CLM table 40 (step S53), acquires the path priority management table 20 (step S54), acquires a volume number corresponding to the LUN registered in the LUN 43 from the CLM table 40, specifies the entry of the path priority management table 20 corresponding to the acquired volume number, and acquires the target information (the target numbers of the fields 23 to 26) of the entry (step S55).

Subsequently, the CPU 10 determines whether the target included in the target information is the target 76 of the subject storage node 4 (step S56). When the target is not the target 76 of the subject storage node 4 (step S56: N), the CPU 10 ends the process.

In contrast, when the target is the target 76 of the subject storage node 4 (step S56: Y), the CPU 10 adds the entries including the compute node number, the target number, the LUN, and the volume number to the CTLM table 60 (step S57) and ends the process. The processes of steps S53 to S57 are executed with respect to the entries of the CLM table 40.

As described above, according to the CTLM table generation process, it is possible to create the CTLM table 60 including entries corresponding to the path associated with the storage nodes 4 among the paths to the target configured in the path priority management table 20. That is, only the paths configured in the path priority management table 20 are registered in the CTLM table 60. Therefore, when the compute node 2 sends an inquiry about the path to a certain LUN to the storage nodes 4, a reply as a usable path is obtained from only the target storage nodes 4 registered in the path priority management table 20, and the compute node 2 can appropriately understand and configure a path of a high priority.

The present invention is not limited to the above-described embodiment but can be changed appropriately without departing from the spirit of the present invention.

For example, in the above-described embodiment, a priority path is determined by way of an example of an OS having four or smaller settable paths to LU. However, a priority path may be determined similarly in an OS in which the number of settable paths to LU is other than 4. Moreover, when a plurality of OSes in which the numbers of paths to LU are different are present, path priority management tables in which the number of priority paths are different may be provided for respective OSes, and the CTLM tables corresponding to the respective OSes may be created.

In the above-described embodiment, a part or all of the processes performed by the CPU may be performed by a hardware circuit. Moreover, a program in the above-described embodiment may be installed from a program source. The program source may be a program distribution server or a storage medium (for example, a portable storage medium).

What is claimed is:

1. A storage system, comprising:
a plurality of storage nodes, each including one or more storage devices,
wherein each of the storage nodes is configured to:
select a priority path to be notified as a usable path to a higher-level apparatus among paths which allow access to a predetermined logical unit to which a storage area of a respective storage device, among the one or more storage devices, is provided, and
send the selected priority path as a reply to an inquiry from the higher-level apparatus about a path to the predetermined logical unit,
wherein each of the paths are accessible to the logical unit via the storage nodes that are different from each other,
wherein each of the storage nodes is configured to:
select the priority path for a new logical unit when the new logical unit is created, and transmit information of the selected priority path to each of the storage nodes via the selected priority path, and wherein each storage node that receives the information of the selected priority path updates the information of its own priority path based on the selected priority path.

2. The storage system according to claim 1, wherein the first storage node includes a storage control unit that is configured to control data access to the predetermined logical unit, wherein a pair of storage control units of two storage nodes that handle access to the same logical unit is formed, one storage control unit being set as an active system, and the other storage control unit being set as a standby system, and wherein the storage node is configured to:

select, as the priority path, at least one of a path to which an exclusive access key for the predetermined logical unit is configured, a path to a storage control unit configured as the active system of the predetermined logical unit, a path to a storage control unit configured as the standby system of the predetermined logical unit, and a path to a storage node having a storage control unit configured as the active system of the predetermined logical unit among the paths accessible to the predetermined logical unit.

3. The storage system according to claim 2, wherein the storage node is configured to:

select, as the priority path, in the order of a path to which an exclusive access key for the predetermined logical unit is configured, a path to a storage control unit configured as the active system of the predetermined logical unit, a path to a storage control unit configured as the standby system of the predetermined logical unit, and a path to a storage node having a storage control unit set as the active system of the predetermined logical unit among the paths accessible to the predetermined logical unit.

4. A path management method executed by a storage system including a plurality of storage nodes, each including one or more storage devices, the method comprising:

selecting, by a first storage node, among the plurality of storage nodes, a priority path to be notified as a usable path to a higher-level apparatus among paths which allow access of a predetermined logical unit to which a storage area of a respective storage device, among the one or more storage devices, is provided from the higher-level apparatus; and sending the selected priority path as a reply to an inquiry from the higher-level apparatus about a path to the predetermined logical unit, wherein each of the paths are accessible to the logical unit via the storage nodes that are different from each other, wherein the first storage node further executes:

selecting the priority path for a new logical unit when the new logical unit is created; and transmitting information of the selected priority path to each of the storage nodes via the selected priority path, wherein each storage node that receives the information of the selected priority path updates the information of its own priority path based on the selected priority path.

5. A non-transitory computer readable recording medium storing a path management program for causing a computer that forms a storage node of a storage system including a plurality of storage nodes, each including one or more storage devices, the path management program causing the computer to execute steps comprising:

selecting a priority path to be notified as a usable path to a higher-level apparatus among paths which allow access of a predetermined logical unit to which a storage area of a respective storage device, among the one or more storage devices, is provided, and sending the selected priority path as a reply to an inquiry from the higher-level apparatus about a path to the predetermined logical unit;

wherein each of the paths are accessible to the logical unit via the storage nodes that are different from each other, wherein steps executed by the computer further comprise:

selecting the priority path for a new logical unit when the new logical unit is created; and transmitting information of the selected priority path to each of the storage nodes via the selected priority path, wherein each storage node that receives the information of the selected priority path updates the information of its own priority path based on the selected priority path.

6. The storage system according to claim 1, wherein the processor unit is configured to, acquire number-of-paths specifying information capable of specifying the number of paths configurable to the higher-level apparatus, and determine a number of priority paths corresponding to the number of configurable paths specified by the number-of-paths specifying information.

7. The storage system according to claim 6, wherein the number-of-paths specifying information is information on a type of an OS being executed in the higher-level apparatus.

* * * * *